United States Patent [19]

Tosa et al.

[11] Patent Number: 5,174,247
[45] Date of Patent: Dec. 29, 1992

[54] WATER INJECTION DIESEL ENGINE

[75] Inventors: Youzou Tosa; Yoshinori Nagae, both of Nagasaki, Japan

[73] Assignee: Mitsubishi Jukogyo Kabushiki Kaisha, Tokyo, Japan

[21] Appl. No.: 824,174

[22] Filed: Jan. 22, 1992

[51] Int. Cl.$^5$ .......................................... F02B 47/02
[52] U.S. Cl. ............................ 123/25 C; 123/25 E; 123/575
[58] Field of Search ............ 123/299, 300, 575, 25 C, 123/25 E

[56] References Cited

U.S. PATENT DOCUMENTS

| | | | |
|---|---|---|---|
| 2,218,522 | 10/1940 | Butler | 123/25 C |
| 3,763,832 | 10/1973 | Fenne | 123/25 C |
| 3,933,132 | 1/1976 | Kishishita | 123/25 C |
| 4,412,512 | 11/1983 | Cottell | 123/25 C |
| 4,417,447 | 11/1983 | Thomas | 123/25 C |
| 4,691,674 | 9/1987 | Otsuka et al. | 123/299 |
| 4,705,010 | 11/1987 | Baranescu | 123/575 |
| 4,736,712 | 4/1988 | Savkar | 123/575 |
| 4,938,606 | 7/1990 | Kunz | 123/25 E |
| 5,012,772 | 5/1991 | Nakamura | 123/25 C |

FOREIGN PATENT DOCUMENTS

| | | | |
|---|---|---|---|
| 1958732 | 6/1970 | Fed. Rep. of Germany | 123/25 C |
| 3237305 | 4/1984 | Fed. Rep. of Germany | 123/25 C |
| 1455006 | 1/1989 | U.S.S.R. | 123/25 C |

Primary Examiner—Willis R. Wolfe
Assistant Examiner—Erick Solis
Attorney, Agent, or Firm—Wenderoth, Lind & Ponack

[57] ABSTRACT

A water injection Diesel engine undergoes stable combustion even though the amount of water to be injected is relatively large. A common fuel injection valve of the water injection Diesel engine injects fuel and water into a cylinder of the engine. A change-over valve and a control valve are provided for alternately opening and closing a fuel feed passage and a water feed passage connected to a water passage of the fuel injection valve. Alternatively, control valves are provided for effectively opening and closing a water feed and a fuel feed which are connected discretely with a fuel passage within the fuel injection valve. In each embodiment, a multi-layered column of alternating layers of water and fuel is formed in the fuel injection valve so as to be injected during a single fuel injection cycle.

6 Claims, 10 Drawing Sheets

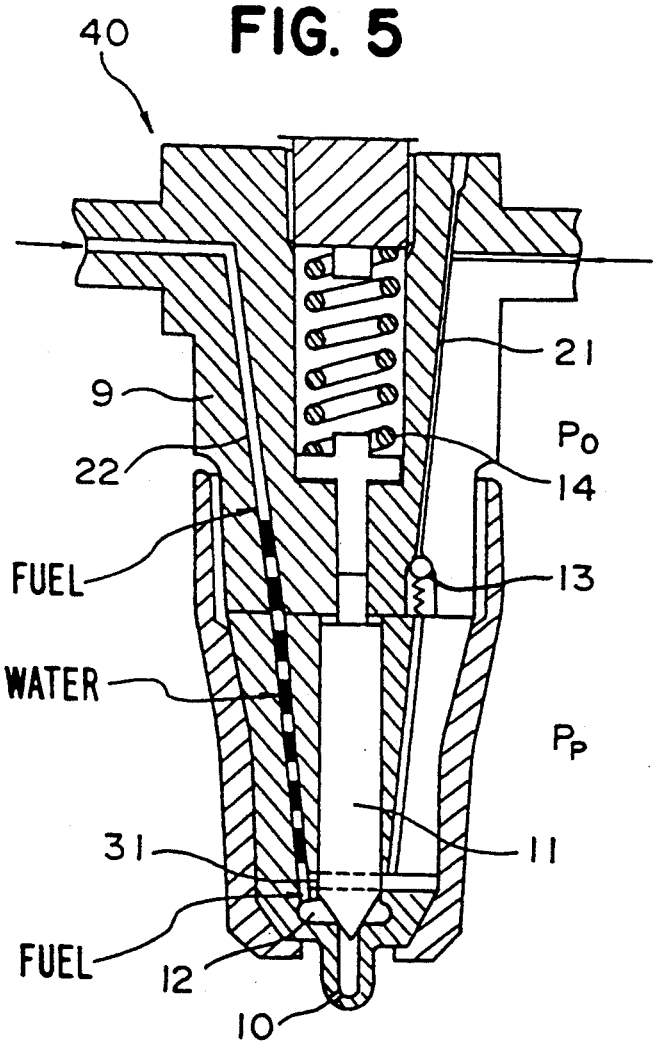

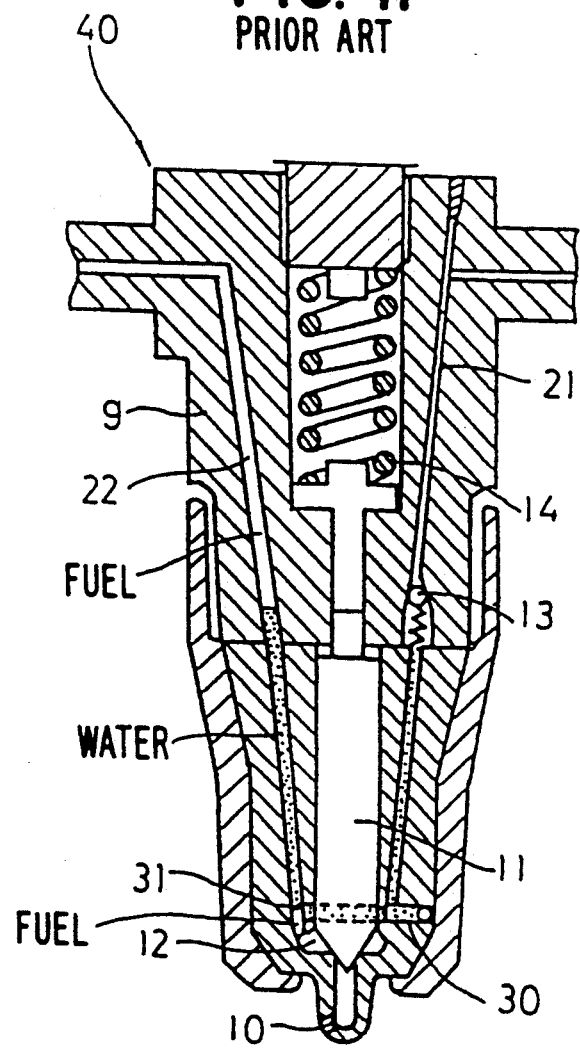

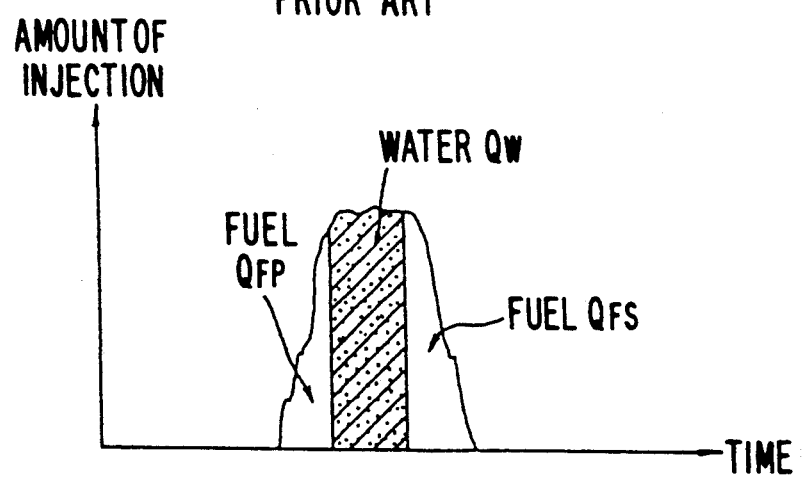

WATER INJECTION DIESEL ENGINE

BACKGROUND OF THE INVENTION

1. Field of the Invention

The present invention relates to a water injection Diesel engine.

2. Description of the Prior Art

As means for effectively reducing nitrogen oxides ($NO_x$) in the exhaust gas of a Diesel engine and reducing the exhaust black smoke and fuel consumption rate of the engine at the same time, there exists a conventional Diesel engine of the type capable of injecting fuel and water from a common fuel injection valve, as shown in FIGS. 10 and 12.

In these Figures, reference numeral 1 designates a fuel tank, numeral 2 a fuel feed pump, numeral 3 a fuel injection pump body, numeral 4 a fuel injection plunger, numeral 5 a plunger barrel, numeral 6 a discharge valve, numeral 7 a check regulator valve disposed in a side passage of the discharge valve 6, numeral 8 a fuel injection tube (fuel feed passage), numeral 40 a fuel/water injection valve, numeral 9 the body of the injection valve 40, numeral 10 an injection port, numeral 11 a valve needle, numeral 12 a fuel reservoir, and numeral 14 a spring for biasing the needle valve 11.

On the other hand, numeral 19 designates a water tank, numeral 18 a water feed pump, numeral 17 a water feed tube, numeral 16 a water feed control valve, numeral 15 a water feed tube, and numeral 13 a water feed check valve for checking the backward flow of water to the control valve. Moreover, numeral 20 designates a control unit for controlling the amount of water to be fed and the feed timing. The control unit responds to a crank angle signal or other operating conditions of the engine to output a control signal to the control valve 16 via a line 23.

The body 9 of the fuel/water injection valve 40 is formed with a fuel passage 22 for establishing communication between the fuel injection tube 8 and the fuel/water injection valve fuel reservoir 12. On the other hand, the water feed check valve 13 communicates with a confluence 31 in the midst of the upper fuel passage 22 through a water passage 30 which is also formed in the body of the fuel/water injection valve 40.

Next, the operation of this system will be described.

The water pumped out of the water tank 19 by the water feed pump 18 is fed via the feed tube 17 to the control valve 16. For a quiescent period in which the plunger of the fuel injection pump 3 does not pump out the fuel, the control valve 16 is held in a open state for a predetermined period through the control unit to feed a predetermined amount of water to the fuel/water injection valve 40 via the feed tube 15. At this time, if the pressure at which the check regulator valve 7 of the fuel injection pump 3 opens is designated at $P_R$ whereas the pressure at which the water feed check valve 13 opens is designated at $P_P$, the following relations hold for the pressure $P_O$ at which the valve needle 11 opens:

$P_O > P_R$ and $P_O > P_P$.

Thus, the water fed flows into the fuel passage 22 via the check valve 13, the water passage 30 and the confluence 31.

The fuel residing in the fuel passage 22 upstream of the confluence 31, i.e., at the side of the fuel injection pump 3, is forced back toward the fuel injection pump 3 via the injection tube 8 by the fed water pressure so that it opens the check regulator valve 7 and flows into the plunger chamber.

As a result, as shown, the fuel/water injection valve 40 is filled with the fuel up to the capacity of $V_1$ and $V_2$, i.e., the sum of the capacity $V_2$ of the fuel reservoir 12 and the capacity $V_1$ of the fuel passage 22 from the confluence 31 to the fuel reservoir 12. The fuel passage 22 upstream of the confluence 31 is filled with a predetermined amount of water and further upstream with the fuel as shown in FIG. 11.

When the plunger 4 of the fuel injection pump 3 rises to start compressing the fuel, the pressure in the injection tube 8, the fuel passage 22 and the fuel reservoir 12 rises, and when it becomes equal to or exceeds the opening pressure $P_O$ of the needle valve 11 the needle valve 11 is opened. At this time, the water in the water passage 30 is not returned to the water tank 19 owing to the check valve 13.

When the valve needle 11 reaches its opening pressure $P_O$, the injection port 10 of the fuel/water injection valve 40 of FIG. 12 injects: the fuel in an amount of $V_1 + V_2$, which has filled the fuel reservoir 12 and the fuel passage 22 up to the confluence, then the water of the predetermined fed amount, and finally the remaining fuel. If the amount of fuel to be injected by a single action is designated as $Q_F$, the amount $Q_{FP}$ of fuel to be injected at first is expressed by $Q_{FP} = V_1 + V_2$, as has been described hereinbefore. The total amount $Q_W$ of water is then injected, and the remaining amount of fuel $Q_{FS}$ is finally injected in an amount as expressed by $Q_{FS} = Q_F - Q_{FP}$.

As a result, the ignition at an initial stage of the fuel stroke of the Diesel engine is ensured with the fuel in the amount $Q_{FP}$. Subsequently, the suction of air into the sprayed atmosphere is increased by the water in the amount $Q_W$ so that the burning rate is raised to reduce the production of black smoke. At the same time, the water is introduced into the flame zone to reduce the $NO_x$.

According to the prior art, the reducing effect of $NO_x$ in the exhaust gas is substantially proportional to the amount $Q_W$ of injected water. If, however, the water amount $Q_W$ is excessively increased relative to the fuel amount $Q_F$, the time interval between the primary and secondary fuel injection amounts $Q_{FP}$ and $Q_{FS}$ is so elongated that the combustion becomes so insufficient that a stable engine operation cannot be achieved. In order to further reduce the $NO_x$, therefore, there is required means for increasing the fuel injection amount $Q_W$ without any deficiency in combustion occurring.

SUMMARY OF THE INVENTION

An object of the present invention is to solve the aforementioned problems of the system of the prior art and to provide a water injection Diesel engine in which combustion is stable even though the amount of injected water is considerably great, owing to the injection of the water in a multi-layered state with the injected fuel.

In a water injection Diesel engine defining a confluence therein at which a fuel passage of a fuel injection valve joins a water feed passage passage, through which water is fed via a solenoid valve and a check valve, both fuel and water may be injected from the fuel injection valve. To achieve the above object of the present invention, water/fuel feeders and a fuel/water change-over valve unit are provided for feeding pressurized water and fuel independently of and alternately with respect to each other to the fuel injection valve so that the water and the fuel forms a multi-layered liquid column in a fuel passage of the fuel injection valve, which column is injected into the cylinder during a fuel injection cycle. In addition, the water is fed to the fuel passage via a control valve and a check valve. Alternatively, in a second embodiment, the fuel passage of the fuel injection valve and a fuel feed passage are joined by a confluence at the side of a valve needle of the fuel injection valve closer to a reservoir of the injection port than the aforementioned confluence. A water feed solenoid valve and a fuel feed control valve are so alternately controlled through a control unit during a quiescent period, from the end of injection by the fuel injection valve to a subsequent injection, that the fuel and water are injected as a multi-layered liquid column.

In the first embodiment, when the control valve is opened during the quiescent time period of the fuel injection valve, pressurized water and fuel are alternately caused to flow into the fuel passage through the control valve 16 via a water/fuel change-over valve unit.

As a result, a multi-layered liquid column of water-liquid-water-fuel—is formed in the fuel passage. When the fuel injection pump is operated, the liquid column is injected from the injection port while maintaining its multi-layered structure.

Thus, even if the amount of injected water $Q_W$ is greater than that in the prior art, the combustion remains stable because the multi-layered column of water and fuel is injected.

As a result, the reduction of $NO_x$ in the exhaust gas is enhanced according to the increase in the amount of water injected.

Next, the operation of the second embodiment for forming the multi-layered liquid column of water and fuel to be injected will be described. When the control valve is opened through the controller unit during the quiescent time of the fuel injection pump, water is fed into the fuel injection valve from a water tank through a water pump and the control valve. The water flows into the fuel passage in the fuel injection valve and fills the fuel passage with the fuel forcing the fuel therein back toward a fuel injection pump. Next, when the water feed control valve is closed and the fuel feed control valve is opened, the fuel forces the water and fuel, which were previously fed into the fuel passage, simultaneously toward the fuel injection pump until fuel fills the fuel passage 22. Subsequently, the fuel feed control valve is closed, and the water feed control valve is opened and the aforementioned procedures are repeated several times. As a result, a multi-layered liquid column of fuel-water-fuel-water—is formed in the fuel passage.

BRIEF DESCRIPTION OF THE DRAWINGS

FIGS. 5 and 6 are explanatory diagrams illustrating the operation of the first embodiment;

FIG. 11 is an explanatory diagram illustrating the operation of the prior art system; and FIG. 12 is a timing diagram of the operation of the prior art system.

DETAILED DESCRIPTION OF THE PREFERRED EMBODIMENTS

Figure 1:
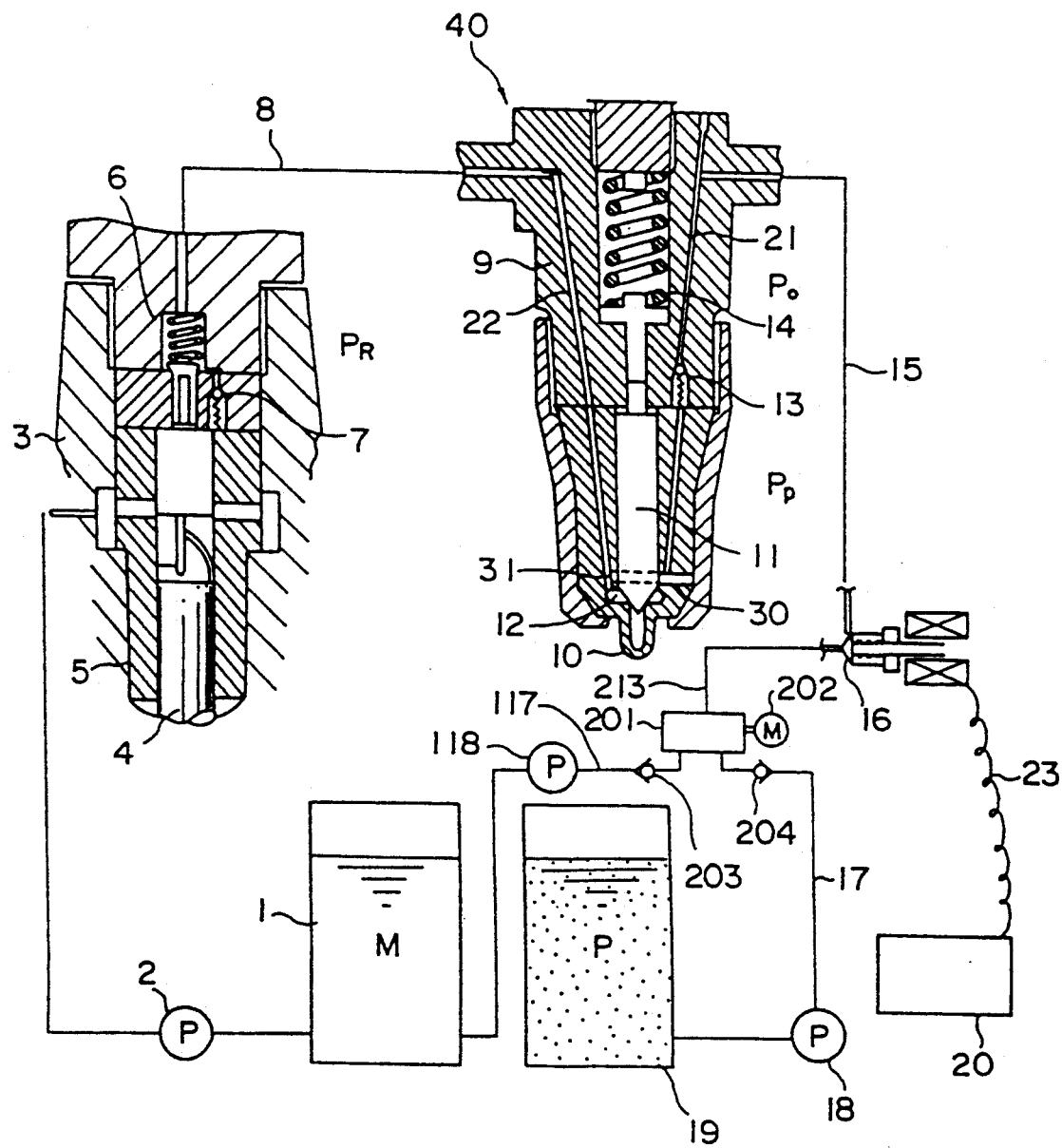
FIG. 1 is a schematic diagram of a first embodiment of a water injection system according to the present invention.

One embodiment of the present invention will be described in the following with reference to FIGS. 1 to 9.

The reference numerals 1 to 31 designate the same parts as those (of FIG. 10) of the example of the prior art.

Numeral 118 designates a fuel pressurizing pump for sucking and pressurizing fuel from the fuel tank 1 and introducing it via a fuel feed tube (second fuel passage) 117 into a change-over valve unit 201. On the other hand, the water having been pressurized by the water feed pump 18 is also introduced via the water feed tube 17 into the change-over valve unit 201. Between both the fuel feed tube 117 and the water feed tube 17 and the change-over valve unit 201, respectively, there are arranged check valves 203 and 204 for allowing fuel and water to flow exclusively from the fuel tank 1 and the water tank 19 to the change-over valve unit 201. Numeral 202 designates a drive unit for driving the change-over valve unit 201. This drive unit 202 may be either synchronized with the number of revolutions of the engine or may output a constant number of revolutions per unit time.

Figure 2:
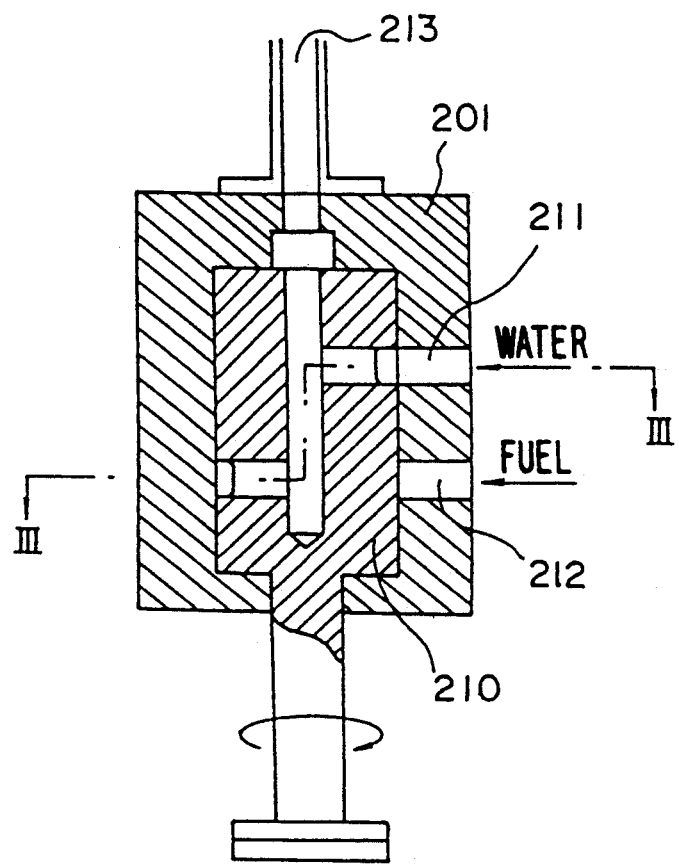
FIG. 2 is a longitudinal sectional view of a water/fuel change-over valve of the system.
Figure 3:
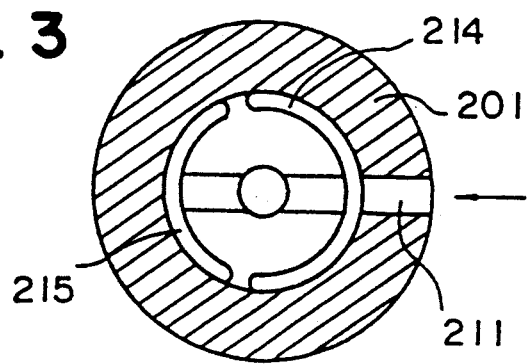
FIG. 3 is a sectional view taken along line III—III of FIG. 2.

FIGS. 2 and 3 show a change-over valve unit 201 of a rotary type, in which numerals 211 and 212 designate water and fuel feed ports, respectively. This rotary valve is formed with a water groove 214 and a fuel groove 215 for feeding the water and fuel alternately into a feed tube 213.

Figure 4:
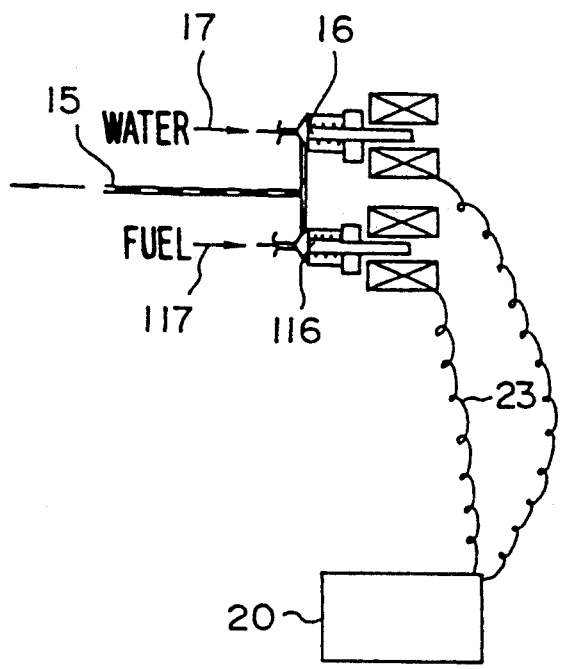
FIG. 4 is a schematic of another change-over valve for use in the system of FIG. 1.

FIG. 4 shows a second version of the change-over valve unit in which the control unit 20 and solenoid control valves 16 and 116 are combined. The numeral 16 designates a water control valve, and the numeral 116 designates a fuel control valve, which are disposed in the water feed tube 17 and a fuel feed tube 117 (second fuel passage), respectively. Thus, the fuel injection pump 3 is alternately opened and closed by the control unit 20 for a predetermined period during the above-noted quiescent period.

Next, the operation of the first embodiment thus constructed will be described.

When the change-over valve unit of FIGS. 2 and 3 is used, the pressurized water and fuel flow via respective feed tubes 17 and 117 into the feed tube 15 (water feed passage) if the control solenoid valve 16 is opened during the quiescent period of the fuel injection pump 3. By the action of the change-over valve 201, the water and fuel are alternately caused to flow while the control ports 211 and 212 are alternately opened and closed.

In the change-over valve unit of FIG. 4, the water and fuel control valves 16 and 116 are alternately controlled by the control unit 20 during the quiescent period of the fuel injection pump 3 so that the water and fuel alternately flow into the feed tube 15 in a manner which corresponds to the respective valve open periods as in case of the first embodiment. As a result, a liquid column having alternate layers of water and fuel is formed in the feed tube 15.

This multi-layered liquid column flows, while maintaining its multi-layered structure, during the injection period into the fuel passage 22 via a feed passage 21, a check valve 13 and a confluence 31, which are formed in the fuel injection valve body 9. The fuel upstream of the confluence 31, i.e., at the side of the fuel injection pump 3, forcibly opens the check regulator valve 7, which is disposed in the fuel injection pump 3. whereby the fuel passage 22 is filled with the multi-layered liquid column. Since, at this time, the water/fuel liquid column filling the feed passage 21 maintains its multi-layered structure, alternating layers of fuel (in white)-water (in black)-fuel-water—, as shown in FIG. 5, are formed in the fuel passage 22.

Figure 6:
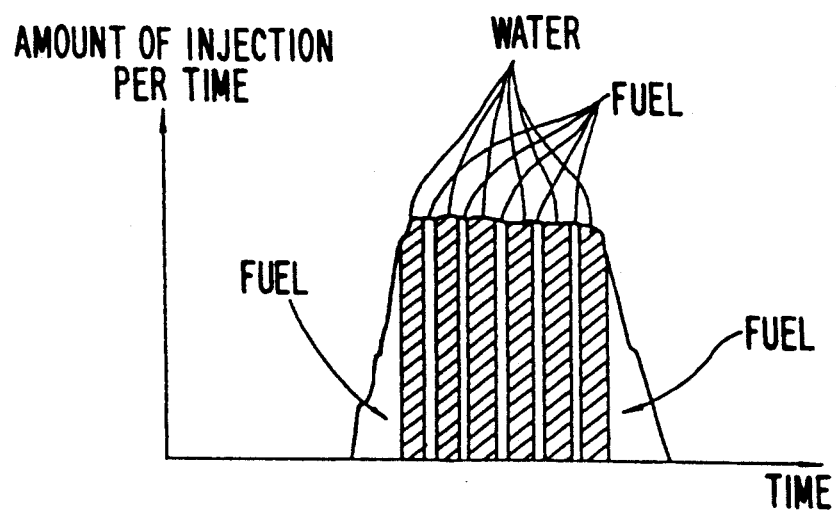

If the fuel injection pump 3 is then operated to start its injection, the valve needle 11 is opened, as shown in FIG. 6, so that the fuel in the fuel reservoir 12 and then the portions of water and fuel in the fuel passage 22 are injected and finally only fuel is injected. These injections are repeated. As a result, the engine combustion remains stable even though a relatively large amount of water is injected for reducing the $NO_x$.

Figure 7:
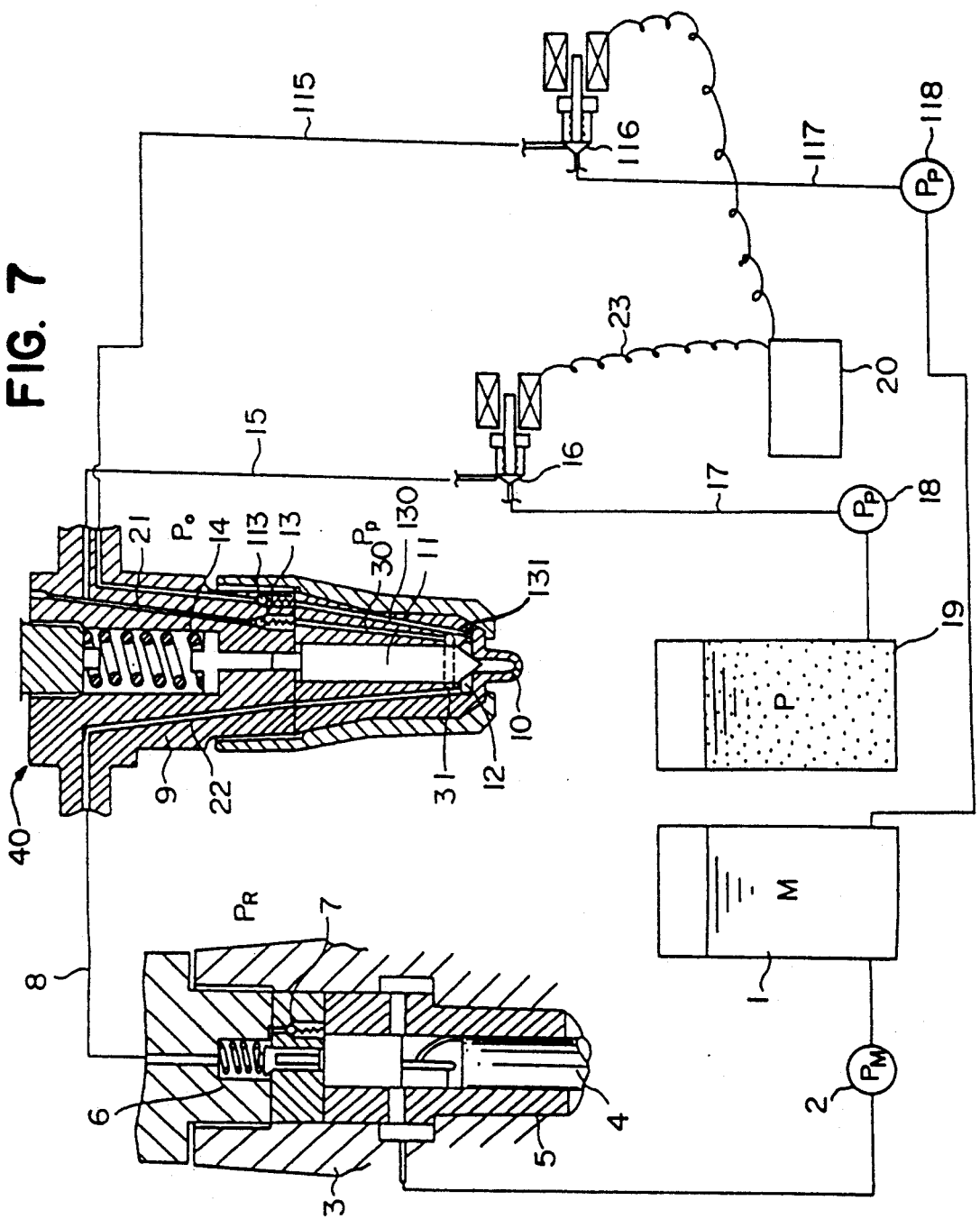
FIG. 7 is a schematic diagram of a second embodiment of a water injection system according to the present invention.
Figure 8:
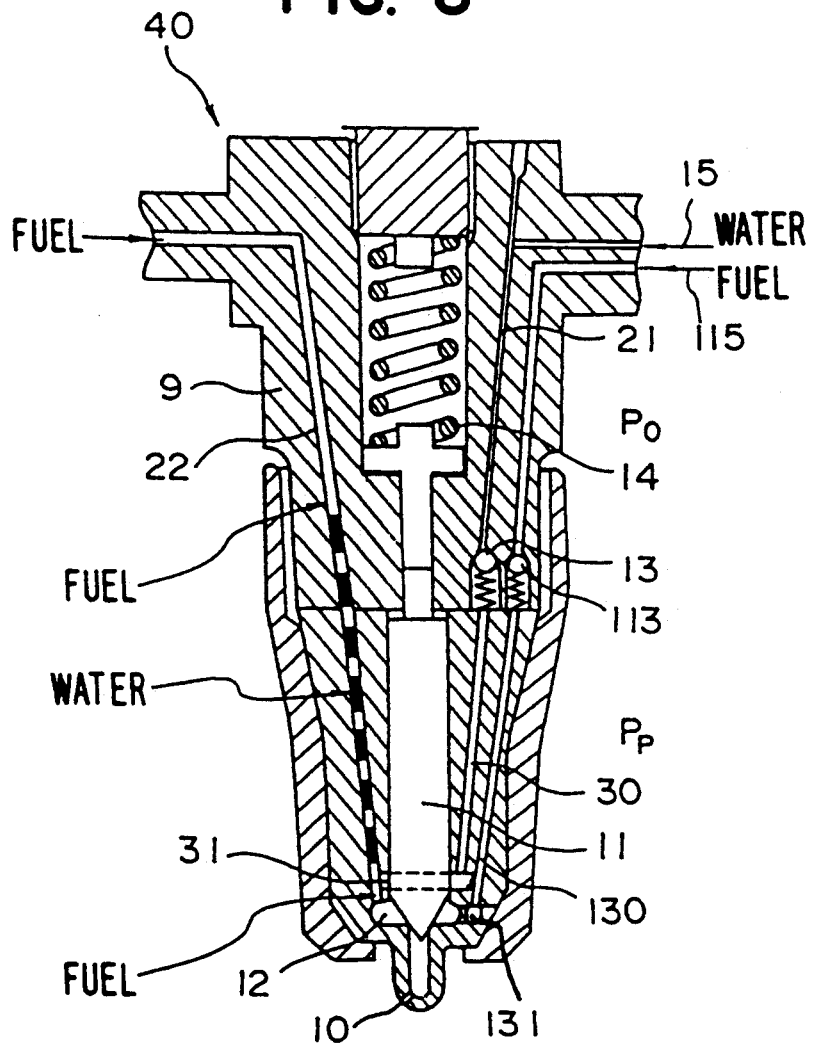
FIGS. 8 and 9 are explanatory diagrams illustrating the operation of the second embodiment.
Figure 9:
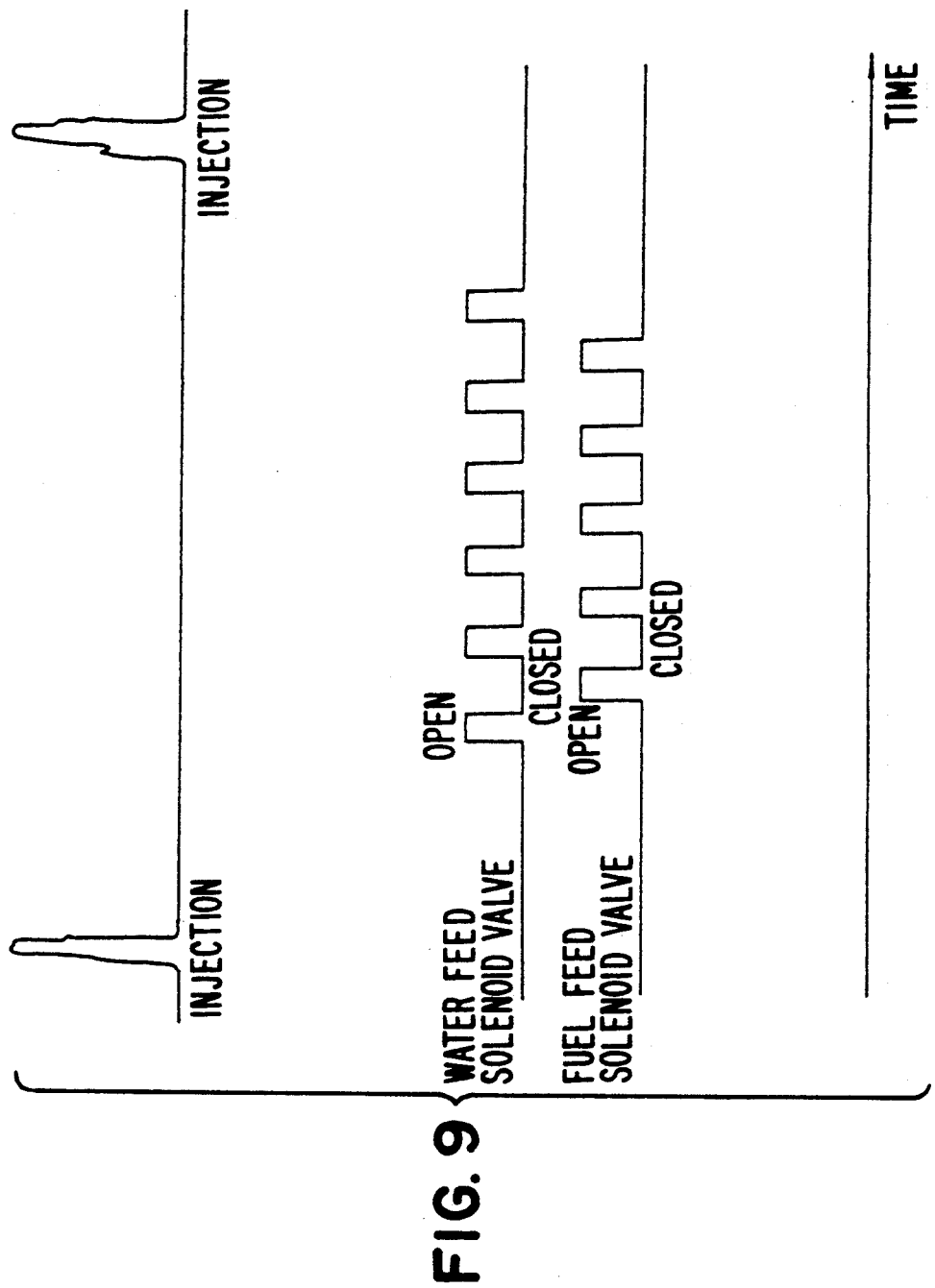

FIGS. 7 to 9 show a second embodiment of the present invention.

Figure 10:
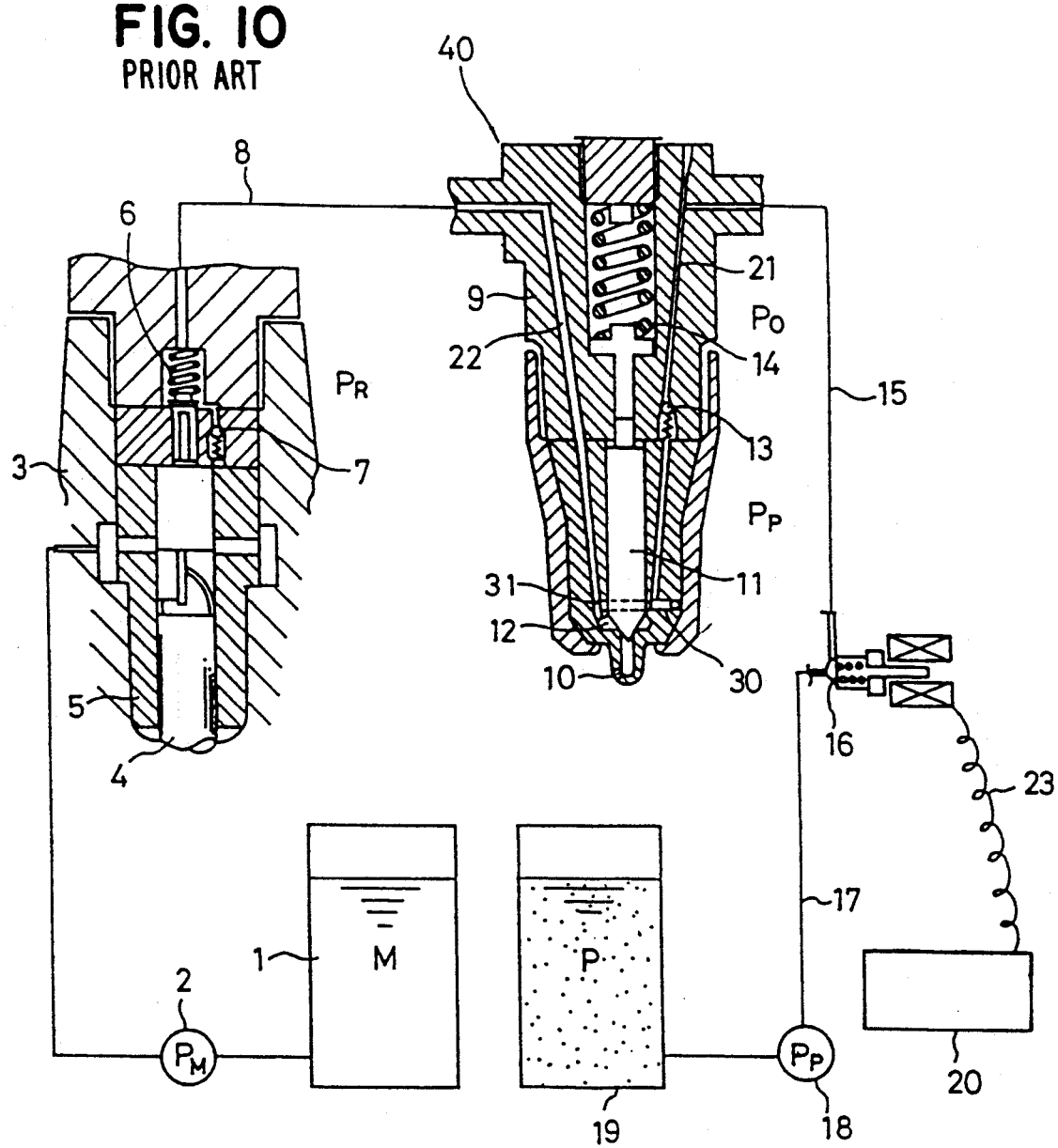
FIG. 10 is a schematic diagram of a prior art water injection system.

In these Figures, reference numerals 1 to 31 designate the same parts of the prior art system (as shown in FIGS. 10 to 12) and thus a detailed description thereof will be omitted. Numeral 118 designates a fuel pump for feeding fuel from the fuel tank 1 via the second fuel passage 117 to the control valve 116. Numeral 115 designates a second fuel feed passage, and numeral 113 designates a fuel feed check valve for controlling a back flow of fluid to the fuel control valve 116.

A fuel passage, which has therein the fuel feed check valve 113 and defines a fuel feed passageway 130, is defined within the body 9 of the valve 40 discretely from the water feed check valve 13, the water passage 30 and the water feed confluence 31. A fuel feed confluence 131 communicates with the fuel passage 22. The fuel feed confluence 131 is disposed closer to the fuel reservoir 12 of the valve needle 11 than the water feed confluence 31. In the second embodiment of FIG. 7, the fuel reservoir 12 is formed at the confluence 131. The timing and degree of opening of the fuel feed control valve 116 are controlled by the control unit 20. Further, both the water feed control valve 16 and the fuel feed control valve 116 are alternately opened and closed for a predetermined time period during the quiescent period of the fuel injection pump.

Next, the operation of the second embodiment will be described.

When the water control valve 16 is opened at first through the control unit 20 during the quiescent period of the fuel injection pump 3, the water to be injected flows, as in the prior art, through the control valve 16 and via the check valve 13 and the water passage 30 from the water feed confluence 31 into the fuel passage 22. This opens the check regulator valve 7 by forcing the fuel in the fuel passage 22 upstream of the confluence 31, i.e., at the side of the fuel injection pump 3, toward the fuel injection pump until the water fills up the fuel passage 22. Next, the control unit 20 closes the water feed control valve 16, and opens the fuel feed control valve 116. As a result, the fuel upstream of the fuel injection confluence 131 downstream of the water feed confluence 31, i.e., at the side of the fuel reservoir 12 of the valve needle 11, flows into the fuel passage 22 while forcing the water and fuel already fed into the fuel passage 22 toward the fuel injection pump 3. As a result, the water in the fuel passage 22 is forced upstream of the water feed confluence 31 so that the portion of the passage 22 between the water and the water feed confluence 131 is filled with the fuel. Subsequently, the control unit closes the fuel feed control valve 116 and opens water feed control valve 16, and operations similar to the aforementioned ones are repeated several times. The operational timing of the control valves 16 and 116 are illustrated in FIG. 9. As a result, the fuel passage 22 has a multi-layered liquid column of fuel (in white)-water (in black)-fuel-water—, formed therein as shown in FIG. 8.

If the fuel injection pump 3 is operated to start the injection, the water and fuel in the fuel reservoir 12 and the fuel passage 22 are injected when the valve needle 11 is opened. At this time, the fuel and water are alternately injected, as shown in FIG. 6, so that the $NO_x$ in the exhaust gas is reduced. Thus, the combustion remains stable even though a large amount of water is injected into the sprayed atmosphere.

According to the present invention, fuel and water are injected in a multi-layered state into the cylinder of a water injection Diesel engine from a common fuel injection valve, unlike the prior art in which the water is intermediately injected. Thus, the combustion is not made unstable because the fuel is intermittently injected, even despite the amount of water injected being considerably large.

As a result, the amount of water to be injected can be increased without inviting any combustion instability in the engine so that the $NO_x$ in the exhaust gas can be effectively reduced according to the increase in the amount of injected water.

What is claimed is:

1. In a water injection Diesel engine having a common fuel injection valve which injects both fuel and water into a cylinder of the engine, the improvements wherein said fuel injection valve defines therein an injection port through which fuel and water are injected into the cylinder, and a fuel passage communicating with said injection port, a fuel feed passage through which fuel is fed in the engine is connected to the fuel passage defined within said fuel injection valve, a water feed passage through which water is fed in the engine is connected to the fuel passage defined within said fuel injection valve, and the engine is provided with changeover valve means for alternately supplying amounts of fuel and water through said fuel feed passage and said water feed passage to said fuel passage defined within the fuel injection valve during each fuel injection cycle of the engine until a column of alternating layers of fuel and water is formed in the fuel passage defined within said fuel injection valve, whereby the column of alternate layers of fuel and water is injectable through the injection port during a single fuel injection cycle in the engine.

2. In a water injection Diesel engine having a common fuel injection valve which injects both fuel and water into a cylinder of the engine, a water tank, and a fuel injection pump, the improvements wherein a first fuel passage is connected to said fuel injection pump so as to receive fuel therefrom, a water feed passage is connected to said water tank so as to receive water therefrom, said fuel injection valve defines therein a confluence which joins said first fuel passage and said water feed passage, a check valve is disposed in said water feed passage, a control valve is operatively connected between said fuel injection valve and said water tank so as to control the flow of water to said confluence defined within the fuel injection valve, a second fuel passage through which fuel is fed in the engine is connected to said water feed passage, a change-over valve connects said second fuel passage with said water feed passage, and said change-over valve is controlled to operate in such a way that amounts of fuel and water are alternately fed to said fuel injection valve through said water feed passageway during each fuel injection cycle of the engine.

3. The improvements in a water injection Diesel engine as claimed in claim 2, wherein a drive unit synchronized with the engine is provided to control said change-over valve.

4. The improvements in a water injection Diesel engine as claimed in claim 2, wherein a drive unit outputting a constant number of revolutions per unit time is provided to control said change-over valve.

5. The improvements in a water injection Diesel engine as claimed in claim 2, wherein a controller is provided to control both said control valve and said change-over valve.

6. In a water injection Diesel engine having a common fuel injection valve which injects both fuel and water into a cylinder of the engine, a water tank, and a fuel injection pump, the improvements wherein a water feed passage connects said water tank to said fuel injection valve, a first fuel feed passage connects said fuel injection pump to said fuel injection valve, a second fuel feed passage through which fuel is fed in the engine is connected to said fuel injection valve, control valves are operatively disposed in said water feed passage and said second fuel feed passage, respectively, so as to allow and interrupt the feed of fuel and water to said fuel injection valve, said fuel injection valve defines therein an injection port through which fuel and water are injected into a cylinder of the engine, a water passage connected to said water feed passage, a first fuel passage connected to said first fuel feed passage, a second fuel passage connected to said second fuel feed passage, a first confluence which joins said first fuel passage and said water passage, and a second confluence which joins said first and said second fuel passages, check valves operatively associated with said water passage and said second fuel passage so as to prevent a back flow of water and fuel therefrom, respectively, and said second confluence is located closer to said injection port than said first confluence.

* * * * *